(12) United States Patent
Mir

(10) Patent No.: US 6,187,162 B1
(45) Date of Patent: Feb. 13, 2001

(54) ELECTRODEIONIZATION APPARATUS WITH SCALING CONTROL

(76) Inventor: Leon Mir, 15 Hobart Rd., Newton, MA (US) 02459

(*) Notice: Under 35 U.S.C. 154(b), the term of this patent shall be extended for 0 days.

(21) Appl. No.: 09/395,327

(22) Filed: Sep. 13, 1999

(51) Int. Cl.$^7$ ................................................ B01D 61/48
(52) U.S. Cl. ........................ 204/524; 204/525; 204/533; 204/632; 204/633
(58) Field of Search .................................. 204/524, 525, 204/533, 632, 633

(56) References Cited

U.S. PATENT DOCUMENTS

| | | | |
|---|---|---|---|
| Re. 35,741 | 3/1998 | Oren et al. | 204/524 |
| 4,632,745 | 12/1986 | Giuffrida et al. | 204/301 |
| 4,636,296 | 1/1987 | Kunz | 204/182.5 |
| 4,747,929 | 5/1988 | Siu et al. | 204/301 |
| 4,753,681 | 6/1988 | Giuffrida et al. | 134/22.17 |
| 4,804,451 | 2/1989 | Palmer | 204/301 |
| 4,871,431 | 10/1989 | Parsi | 204/182.4 |
| 4,931,160 | 6/1990 | Giuffrida | 204/301 |
| 4,956,017 | 9/1990 | Giuffrida et al. | 204/301 |
| 5,019,270 | 5/1991 | Afeyan et al. | 210/656 |
| 5,026,465 | 6/1991 | Katz et al. | 204/182.4 |
| 5,066,375 | 11/1991 | Parsi et al. | 204/182.4 |
| 5,116,509 | 5/1992 | White | 210/644 |
| 5,120,416 | 6/1992 | Parsi et al. | 204/182.4 |
| 5,154,809 | 10/1992 | Oren et al. | 204/182.4 |
| 5,203,976 | 4/1993 | Parsi et al. | 204/182.4 |
| 5,228,989 | 7/1993 | Afetan et al. | 210/198.2 |
| 5,292,422 | 3/1994 | Liang et al. | 204/301 |
| 5,308,466 | 5/1994 | Ganzi et al. | 204/151 |
| 5,308,467 | 5/1994 | Sugo et al. | 204/301 |
| 5,316,637 | 5/1994 | Ganzi et al. | 204/182.4 |

(List continued on next page.)

OTHER PUBLICATIONS

P–Series Heavy Industrial CDI®Systems Single and Multiple Module, United Staes Filer Corporation, Lowell, Massachusetts (no date).

Deionization, EDI and Membranes: Practical Ways To Reduce Chemical Usage When Producing High–Purity Water, Ultrapure Water® Jul./Aug. 1999, pp. 52–55.

Gary C. Ganzi et al., Water Purification and Recycling Using the CDI Process, Ionpure Technologies Corp., Lowell, MA 01851, pp. 49–53. (no date).

E. Glueckauf, M.Sc., D.Sc., Electro–Deionisation Through a Packed Bed, Dec. 1959, pp. 646–651.

O. Kedem et al., A Simple Electrodialysis Stack, Desalination, 24 (1978) pp. 313–319, Elsevier Scientific Publishing Company, Amsterdam—Printed in The Netherlands.

Primary Examiner—Arun S. Phasge
(74) Attorney, Agent, or Firm—Fish & Richardson, P.C.

(57) ABSTRACT

First and second stages are used in electrodeionization to purify water including calcium and carbon dioxide and its hydrates. The diluting flow channels of the first stage include only anion exchange material or cation exchange material, and thus remove either carbon dioxide and its hydrates (and other anions) or calcium (and other cations) but not the other. The diluting flow channels of the second stage receive the diluting channel effluent from the first stage and include the other type of exchange resin (or a mixed resin) and remove the oppositely charged ions. The brine effluent from the concentrating flow channels in the first stage is isolated from the second stage, and calcium and total inorganic carbon tend to be removed in different stages so as to deter calcium carbonate precipitation in any of the concentrating flow channels. Also the concentrating channels can include cation exchange material next the anion membrane, with pH being lowered at the surface of the anion so as to limit calcium carbonate precipitation in the concentrating flow channel.

29 Claims, 4 Drawing Sheets

U.S. PATENT DOCUMENTS

| | | |
|---|---|---|
| 5,346,924 | 9/1994 | Giuffrida ............................... 521/28 |
| 5,376,253 | 12/1994 | Rychen et al. ....................... 204/301 |
| 5,384,042 | 1/1995 | Afeyan et al. .................... 210/198.2 |
| 5,503,729 | 4/1996 | Batchelder et al. ................. 204/630 |
| 5,512,173 | 4/1996 | Uchino et al. ....................... 204/632 |
| 5,531,899 | 7/1996 | Yen et al. ........................... 210/638 |
| 5,558,753 | 9/1996 | Gallagher et al. ................... 204/632 |
| 5,593,563 | 1/1997 | Denoncourt et al. ................ 204/254 |
| 5,679,228 | 10/1997 | Elyanow et al. .................... 204/524 |
| 5,679,229 | 10/1997 | Goldstein et al. ................... 204/524 |
| 5,681,438 | 10/1997 | Proulx ................................. 204/627 |
| 5,738,775 | 4/1998 | Nagai et al. ......................... 204/632 |
| 5,759,373 | 6/1998 | Terada et al. ......................... 204/54 |
| 5,762,774 | 6/1998 | Tessier ................................. 204/524 |
| 5,833,861 | 11/1998 | Afeyan et al. ....................... 210/656 |
| 5,858,191 | 1/1999 | DiMascio et al. ................... 204/524 |
| 5,868,915 | 2/1999 | Ganzi et al. ......................... 204/524 |
| 5,961,805 | 10/1999 | Terada et al. ........................ 204/632 |

ELECTRODEIONIZATION APPARATUS WITH SCALING CONTROL

BACKGROUND OF THE INVENTION

The invention relates to apparatus and methods for carrying out electrodeionization to purify water. Electrodeionization is a process for removing ions from liquids by sorption of these ions into a solid material capable of exchanging these ions for either hydrogen ions (for cations) or hydroxide ions (for anions) and simultaneous or later removal of the sorbed ions into adjacent compartments by the application of an electric field. (See Glueckauf, E., "Electro-Deionization Through a Packed Bed", December 1959, pp. 646–651, British Chemical Engineering for a background discussion.) The hydrogen and hydroxide ions needed to drive the ion exchange process are created by splitting of water molecules at the interface of anion and cation exchanging solids that contact each other in the orientation that depletes the contact zone of ions, when in the presence of an electric field. This orientation requires that the anion exchanging material face the anode and the cation exchanging material face the cathode. The created hydroxide ions enter the anion exchanging material, and the created hydrogen ions enter the cation exchanging material.

The electrodeionization process is commonly carried out in an apparatus consisting of alternating diluting compartments and concentrating compartments separated by anion permeable and cation permeable membranes. The diluting compartments are filled with porous ion exchanging solid materials through which the water to be deionized flows. The ion exchanging materials are commonly mixtures of cation exchanging resins and anion exchanging resins (e.g., U.S. Pat. No. 4,632,745), but alternating layers of these resins have also been described (e.g., U.S. Pat. Nos. 5,858, 191 and 5,308,467). Ion exchanging materials consisting of woven and non-woven fibers have also been described. (e.g., U.S. Pat. Nos. 5,308,467 and 5,512,173). The compartments adjoining the diluting compartment into which the ions are moved by the applied electric field, called concentrating compartments, may be filled with ion exchanging materials or with inert liquid permeable materials. An assembly of one or more pairs of diluting and concentrating compartments, referred to as a "cell pair", is bounded on either side by an anode and a cathode which apply an electric field perpendicular to the general direction of liquid flow. Flow of water is provided past the anode and cathode.

The diluting compartments are each bounded on the anode side by an anion permeable membrane and on the cathode side by a cation permeable membrane. The adjacent concentrating compartments are each correspondingly bounded by a cation permeable membrane on the anode side and an anion permeable membrane on the cathode side. The applied electric field causes anions to move from the diluting compartment across the anion permeable membrane into the concentrating compartment nearer the anode and cations to move from the diluting compartment across the cation permeable membrane into the concentrating compartment nearer the cathode. The anions and cations become trapped in the concentrating compartments because the movement of anions toward the anode is blocked by a cation permeable membrane, and the movement of cations toward the cathode is blocked by an anion permeable membrane. A flow of water is set up to remove the ions from the concentrating compartments. The net result of the process is the removal of ions from the water stream flowing through the diluting compartments and their concentration in the water flowing through the concentrating compartments.

Electrodeionization (EDI) stacks frequently suffer from precipitation of calcium carbonate in the concentrating compartments as well as in the cathode compartment. (See AEDI and Membranes: Practical Ways to Reduce Chemical Usage when Producing High Purity Water, William E. Katz in Ultrapure Water, Vol. 16, No. 6 July/August 1999, pp 52–57). The consequence of this "scaling" is an increase in stack resistance, a drop in current density and eventually a sharp decrease in the purity of the product water. Vendors of EDI equipment suggest that the concentration of calcium in the feed to the EDI be limited to very low levels; e.g., less than 0.5 ppm. (U.S. Filter Literature No. US2006). While this concentration can be achieved when the electrodeionization apparatus is fed with reverse osmosis (RO) permeate from an RO system with new membranes, and the RO system is operating properly, the suggested values can be exceeded when these conditions do not hold.

In order for calcium carbonate to precipitate in solution the Langelier Saturation Index (LSI) has to be positive. In the cathode compartment the pH can be high enough for the LSI to be positive; precipitation of calcium carbonate is therefore to be expected under some circumstances. The LSI of RO permeates is always negative. Even in the EDI brine the concentrations of calcium and bicarbonate are so low that the LSI is still negative, at the prevailing pH. Thus, on the basis of consideration of LSI alone, one would not expect the precipitation of calcium carbonate that occurs within EDI concentrating compartments. This phenomenon is instead explainable based upon local conditions.

When a concentrating compartment from a Ascaled@ EDI stack is examined, the scale is observed on the anion membrane, predominantly halfway between the inlet and the outlet of the stack. This pattern can be explained on the basis of the mechanism by which an EDI stack removes weak acids like carbon dioxide and silica. At the pH of RO permeate, only a tiny fraction of silica is ionized, and a large fraction of the total inorganic carbon (TIC) is in the form of carbon dioxide. In order for silica and carbon dioxide to be removed by EDI, the feed solution needs to contact anion exchange resin in the diluting compartment, which is partly in the OH— form, regenerated. Carbon dioxide and silica diffuse from solution into the partly regenerated anion resin and react with the OH$^-$ to form the HCO$_3^-$, CO$_3^{50}$ and HSiO$_3^-$ anions which are moved, along with substantial amounts of OH$^-$, by the applied voltage gradient, into the concentrating compartment. In order for the above mechanism to operate, the voltage drop in the diluting compartment has to be high enough, typically 2 to 3 volts, to regenerate some portion of the anion resin by the splitting of water into OH$^-$ and H$^+$.

Figure 5:
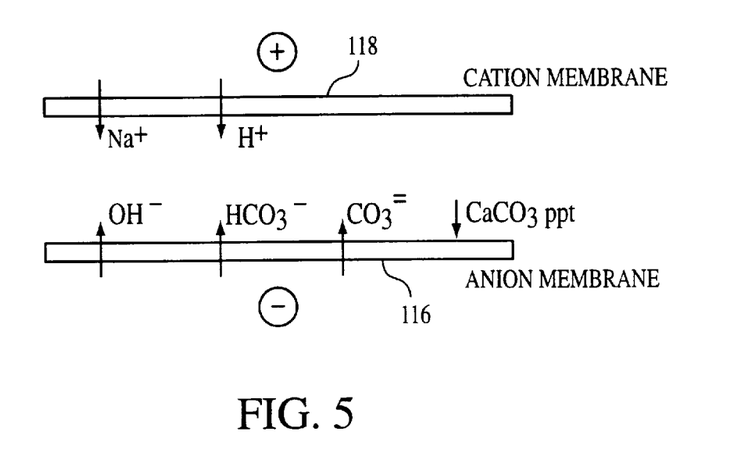
FIG. 5 is a diagram showing the conditions involved in scaling in a concentrating cell of electrodeionization apparatus.

At the inlet portion of an EDI stack the extent of resin regeneration in the diluting compartment is low. Carbon dioxide and silica are therefore not removed in the front part of the stack. Toward the middle of the stack the concentrations of the ions in the feed water have dropped sharply and water splitting takes place. The resins are partly regenerated and the carbon dioxide and silica are removed. The pH of the solution on the concentrating side surface of the anion membrane is therefore very high; the concentration of CO$_3^=$ is also high, and the LSI can be positive at the concentration of calcium prevailing in the concentrate. (See U.S. Pat. No. 5,593,563). Calcium carbonate can therefore precipitate, as shown in FIG. 5. Note that the LSI within the bulk of the concentrate is still negative because the pH of the concentrate is virtually the same as that of the feed. The high pH at the surface of the anion membrane and the corresponding low pH at the surface of the cation membrane are boundary layer phenomena.

Toward the outlet of the stack virtually all of the anions have been removed. Although the concentrating side of the anion membrane is still at a very high pH, the concentration of $CO_3^=$ is so low that the LSI index is negative, and calcium carbonate does not precipitate. If it were not for the need to remove the weak acids by operating the EDI stack in a partly regenerated form, there would not be any problem with calcium carbonate precipitation. In order for EDI stacks to replace ion exchange beds, which remove these weak acids, EDI stacks must be operated in a partly regenerated form and consequently calcium carbonate precipitation is always a threat. The problem of calcium carbonate precipitation has been broadly recognized, and various suggestions have been made to deal with it. One approach is the periodic reversal of the role of the diluting and concentrating compartments with a simultaneous reversal of the polarity of the electrodes. (e.g., U.S. Pat. Nos. 4,956,071 and 5,558,753). Drawbacks of this approach include the production of low quality water during some parts of the operating cycle and the complexity and expense of the valving system needed to implement the process.

The special problem of calcium carbonate precipitation in the cathode compartment, exacerbated by the formation of hydroxide ions, has been dealt with by filling the cathode compartment with an electrically conductive medium. (e.g., U.S. Pat. No. 5,593,563). This is said to reduce the concentration of hydroxide ions at the surface of the electrode by distributing the current over a larger area and thus decreasing the degree of calcium carbonate supersaturation.

Calcium carbonate scaling can be prevented by reducing or eliminating any of the three prerequisites of scaling; calcium, carbon dioxide and bicarbonate or alkaline pH. The brute force chemical approaches—softening the RO feed or adding acid to the cathode compartment or to the concentrate—re-institute the very problems of chemical supply and waste disposal that EDI is designed to eliminate and are therefore fundamentally unacceptable. More acceptable approaches are the softening of the EDI feed, which has a much lower concentration of calcium than the RO feed, or the removal of carbon dioxide by air stripping. These approaches entail additional capital costs and operating expenses. It has also been suggested that the concentration of salts in the concentrating compartment be reduced by reducing the fraction of the feed water that is recovered as the pure water stream. This approach is fundamentally unacceptable because of its expense.

SUMMARY OF THE INVENTION

In one aspect, the invention features, in general, using first and second stages in electrodeionization to purify water including calcium and carbon dioxide and its hydrates. The diluting flow channels of the first stage include only anion exchange material or cation exchange material, and thus remove either carbon dioxide and its hydrates (and other anions) or calcium (and other cations) but not the other. The diluting flow channels of the second stage receive the diluting channel effluent from the first stage and include the other type of exchange resin (or a mixed resin) and remove the oppositely charged ions. The brine effluent from the concentrating flow channels in the first stage is isolated from the second stage, and calcium and carbon dioxide and its hydrates tend to be removed in different stages so as to deter calcium carbonate precipitation in any of the concentrating flow channels.

In another aspect, the invention features, in general, using electrodeionization to purify water including calcium and inorganic carbon. The concentrating channels include cation exchange material nearer to the anion membrane than the cation membrane, and pH is lowered at the surface of the anion so as to limit calcium carbonate precipitation in the concentrating flow channel.

Preferred embodiments of the invention may include one or more of the following features. Each concentrating flow channel can include anion exchange material between the cation membrane and the cation exchange material so that water splitting occurs between the anion exchange material and the cation exchange material. The anion exchange material in the concentrating channel is in a first fixed structure, and the cation exchange material in the concentrating channel is in a second fixed structure. The anion exchange material and cation exchange material in the concentrating channel can directly contact each other, or they can be separated by an a cation membrane, cation/anion membrane pair, or a bipolar membrane. Water splitting occurs at the interface of an anion material or membrane with a cation material or membrane. The anion exchange material or cation exchange material in the concentrating channel can be provided as two layers with a membrane that inhibits mixing of the brine in the anion exchange layer with the brine in the cation exchange layer, such as a dialysis membrane, located between the two layers. This membrane is chosen so as not to increase the electrical resistance of the concentrating compartment unduly. One can use the various membranes and layers in the concentrating channels in single stage electrodeionization or in two-stage electrodeionization to provide even further improvements in reduced scaling. Embodiments of the invention may include one or more of the following advantages. The tendency of scaling is reduced by modifying the design of the EDI stack without additional unit operations.

Other advantages and features of the invention will be apparent from the following description of particular embodiments thereof and from the claims.

DETAILED DESCRIPTION OF PARTICULAR EMBODIMENTS

Figure 1:
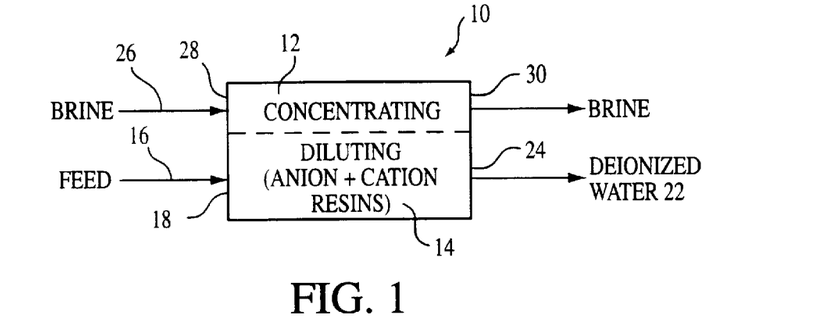
FIG. 1 is a flow diagram of a single-stage electrodeionizing apparatus.
Figure 2:
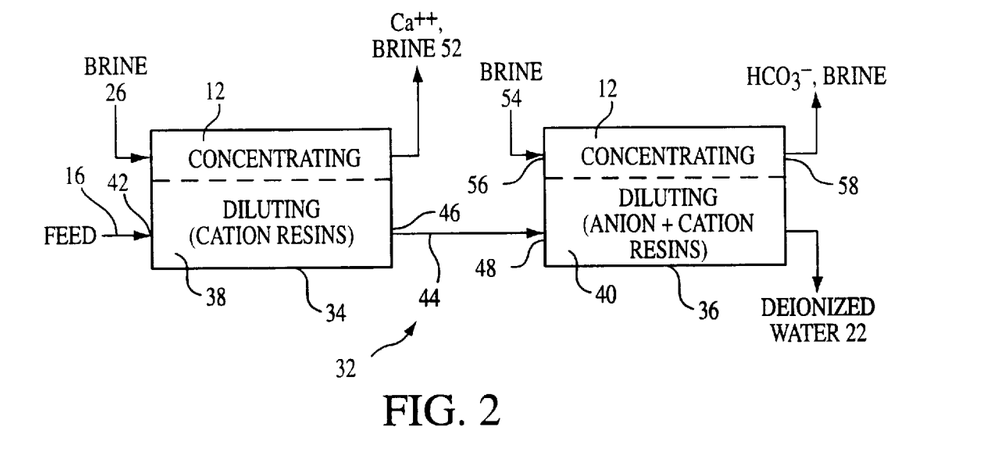
FIG. 2 is a flow diagram of a two-stage electrodeionizing apparatus.
Figure 3:
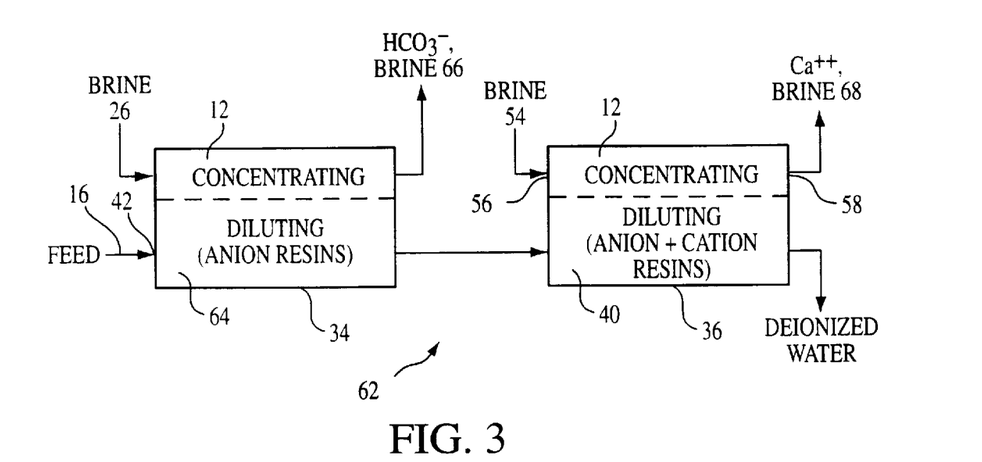
FIG. 3 is a flow diagram of an alternative two-stage electrodeionizing apparatus.

Referring to FIGS. 1–3, there are shown three different flow configurations for electrodeionization apparatus. Single-stage electrodeionization apparatus 10 is shown in FIG. 1. Apparatus 10 has a plurality of concentrating chambers 12 (shown as a single box in FIG. 1) and a plurality of diluting chambers 14 (again shown as a single box) which have both anion exchange resin and cation exchange resin. Feed water 16 (typically the output of RO apparatus) enters inlet 18 of the diluting chambers 14, and is therein converted to deionized water 20 provided at outlet 24. Brine 26 enters inlet 28 of concentrating chambers 12, picks up ions removed from the diluting channels, and leaves outlet 30. By employing one of the arrangements described in FIGS. 6–11 for concentrating channel 12, single-stage electrodeionization apparatus 10 can be provided with resistance to scaling formation.

Two-stage electrodeionization apparatus 32 is shown in FIG. 2. Apparatus 32 has first stage 34 and second stage 36. Both stages 34, 36 have a plurality of concentrating chambers 12 and a plurality of diluting chambers, though diluting chambers 38 of first stage 34 have only cation exchange resin, while diluting chambers 40 of second stage 36 have both anion exchange resin and cation exchange resin. Feed water 16 enters inlet 42 of the diluting chambers 38, and the effluent 44 at the outlet 46 of diluting chambers 38 is connected as the inflow to the inlet 48 of diluting chamber 40 of second stage 36. Brine 26 enters inlet 50 of concentrating chambers 12 of first stage 34, picks up cations removed from the diluting channels, and leaves outlet 30 as brine 52, including Ca++. Water splitting at the interface of the anion membrane with the cation exchange material in the diluting channels 38 regenerates the cation resin and replaces the cations that are removed with $H^+$, which converts $HCO_3^-$ in the feed water into $CO_2$. This suppresses the transfer of TIC into the concentrating compartment and thus reduces the scaling potential, even though the pH of the concentrating compartment is alkaline. Fresh brine 54 enters inlet 56 of concentrating chambers 12 of second stage 36, picks up anions (in particular HCO3−), weak acids and cations not removed in the first stage, and leaves outlet 58 as brine 60, including HCO3−. Deionized water 22 leaves diluting chamber 40. Because Ca++ is removed in the first stage without HCO3−, and HCO3− is removed in the second stage without Ca++, Ca++ and HCO3− do not coexist at the same location in the apparatus, and CaCO3 precipitation is avoided. Two-stage apparatus 32 thus inherently provides scaling resistance regardless of the type of design for concentrating channels 12. One can additionally use one of the arrangements shown in FIGS. 6–11 for concentrating channels 12, to reduce any scaling potential due to the presence of small concentrations of TIC that were transferred from the diluting channel via the solution phase. This provides even further resistance to scaling.

Two-stage electrodeionization apparatus 62, shown in FIG. 3, is similar to apparatus 32 (FIG. 2) except that the diluting chambers 64 of the first stage have anion exchange resins only, instead of cation exchange resin only as in diluting chambers 38 in FIG. 2. Brine 26 enters inlet 50 of concentrating chambers 12 of first stage 34, picks up anions removed from the diluting channels, and leaves outlet 30 as brine 66, including HCO3−. Water splitting at the interface between the anion exchange resin in channels 64 and the cation membrane renders the diluting channel alkaline. This converts carbon dioxide to bicarbonate and thus results in very complete removal of TIC into the concentrating compartment. The concentrating compartment 12 of first stage 34 is acidic, and hence no scaling can take place within it. It is possible that the LSI in the diluting compartment could become positive, for some feed compositions, and scaling could then take place. Minimization of this possibility requires careful control of the current density so as to avoid excessive regeneration of the resin in the diluting compartment. Fresh brine 54 enters inlet 56 of concentrating chambers 12 of second stage 36, picks up cations (in particular Ca++) and cations not removed in the first stage, and leaves outlet 58 as brine 68, including Ca++. Because HCO3− is removed in the first stage without Ca++, and Ca++ is removed in the second stage without HCO3−, Ca++ and HCO3− do not coexist at the same location in the apparatus, and CaCO3 precipitation is avoided. Two-stage apparatus 62 thus inherently provides scaling resistance regardless of the type of design for concentrating channels 12. When one of the arrangements shown in FIGS. 6–11 is used for concentrating channels 12, even further resistance to scaling can be provided.

Figure 4:
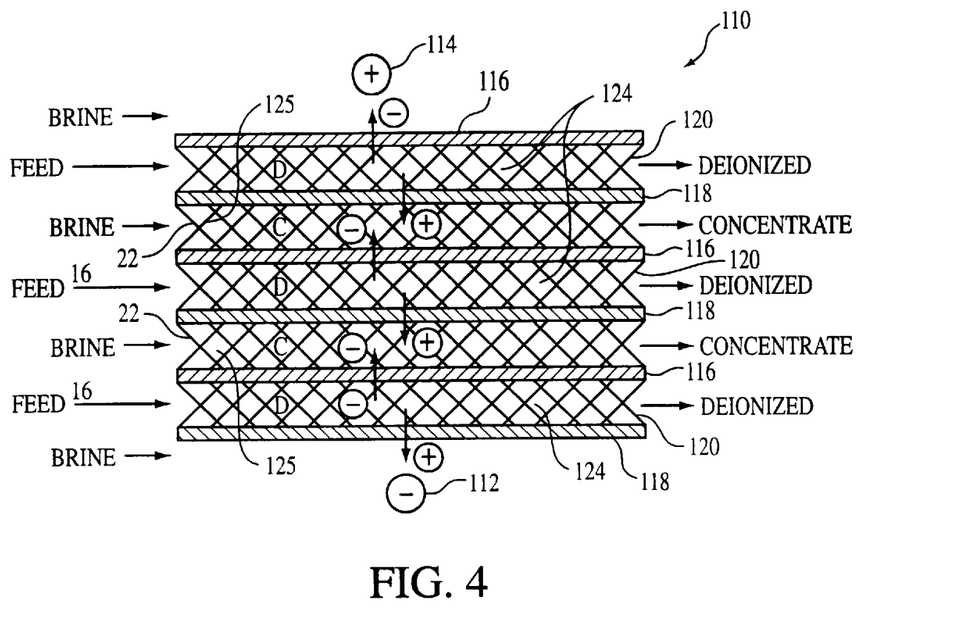
FIG. 4 is a diagram of an electrodeionization stack useful in the FIG. 1, 2 or 3 apparatus.

FIG. 4 shows the details of electrodeionization stack 110, used in single-stage electrodeionization apparatus 10 and in first stage 34 and second stage 36 of two-stage deionization apparatus 32 and two-stage electrodeionization apparatus 62. Stack 110 includes cathode 112, anode 114 spaced from cathode 112, and a plurality of alternating anion permeable membranes 116, and cation permeable membranes 118. Diluting channels 120 ("D") are provided between each pair of an anion permeable membrane 116 that faces anode 114 and a cation permeable membrane 118 that faces cathode 112. Concentrating channels 122 ("C") are provided between each pair of an anion permeable membrane 116 that faces cathode 112 and a cation permeable membrane 118 that faces anode 114. Water flows are provided past the cathode 112 and the anode 114. Diluting channels 120 and concentrating channels 122 can be about 3.0 mm thick. Ion exchange materials 124 are located in diluting channels 120, and spacers 125 are located in concentrating channels 122. Ion exchange materials 124 can be fixed ion exchange materials, which are described below. Spacers 125 can be ion exchange resin or ion inactive, permeable material; examples of different spacer arrangements are described in FIGS. 6–11. Cathode 112, anode 114, membranes 116 and membranes 118 can be made of components and materials typically used in deionization apparatus, as described, e.g., in the above-referenced patents, which are hereby incorporated by reference. As is well known in the art, the components shown on FIG. 4 are assembled together as a stack between pressure plates held together by bolts or a hydraulic ram or in a housing that contains the components and provides manifolds to direct the incoming liquid to and the outgoing liquid from diluting channels 120 and concentrating channels 122. Diluting channels 120 and concentrating channels 122 are typically between 1.0 mm and 5.0 mm thick, and there typically are 10 to 300 diluting channels. The surface area of each membrane is typically between 0.5 and 5.0 square feet. Fixed ion exchange materials 124 include cation exchange materials and anion exchange materials that are fixed in close contacting position with respect to each other. Such materials are described in detail in an application filed concurrently herewith and entitled "Electrodeionization Apparatus with Fixed Ion Exchange Materials", which application is hereby incorporated by reference. Fixed ion exchange materials 124 can be provided in strands of combined anion and cation exchange materials in woven fabric, nonwoven fabric (randomly oriented strands) or extruded netting. Fixed ion exchange materials could also be provided by open cell foam and by combined exchange particles. The strands used in the fabrics can also take a variety of forms. The strands can be made in the form of a bundle of multiple filaments, in the form of braided strands, and in the form of a combined exchange particle filament, which is made of cation exchange particles and anion exchange particles that are held together by binder. The open cell foam includes cation exchange particles, anion exchange particles and binder and has an interconnected network of flow passages herethrough. The combined ion exchange particles are made up of cation exchange particles, anion exchange particles and binder and are sufficiently large so as to cause an acceptably low pressure drop in the flow channels. In some embodiments the ion exchange materials are not mixed, but instead include only anion exchange materials or particles or cation exchange materials or particles in a channel between membranes or region in a channel between membranes. While it is possible to use packed ion exchange in the diluting and concentrating channels in some cases, in all cases the preferred stack design is based on the fixed ion exchange structure described above.

FIG. 5 shows the ions involved in scaling in the concentration channel in the absence of measures to reduce or avoid such scaling as described herein.

FIGS. 6–11 show six different spacer arrangements for the concentrating channels 12 that are designed to provide a reduced pH at the surface of the anion membrane so as to avoid CaCO3 precipitation. The six concentrating channel arrangements can be used with any of the three different system configurations of FIGS. 1–3.

Figure 6:
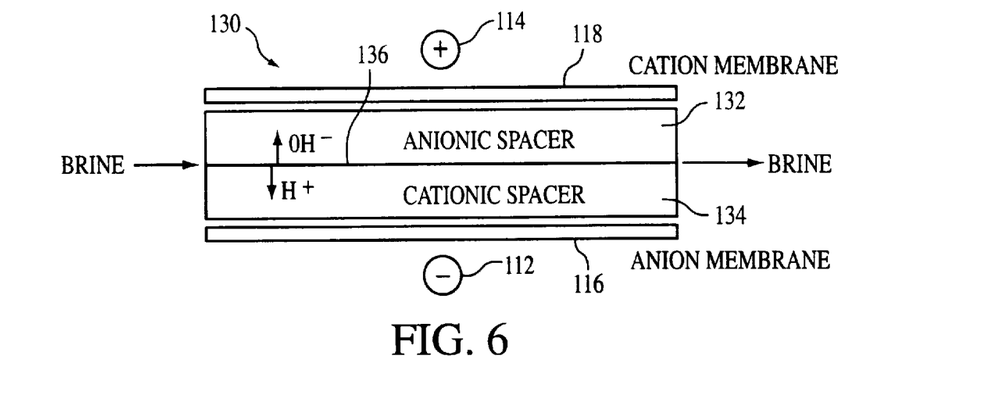
FIGS. 6–11 are diagrams of alternative embodiments for concentrating cells useful in the FIG. 1, 2 or 3 apparatus.

Referring to FIG. 6, concentrating channel 130 is filled with a layer of anion exchanging material 132 (also referred to as anionic spacer 132) next to the cation permeable membrane 118 and a layer of cation exchanging material 134 (also referred to as cationic spacer 134) next to anion permeable membrane 116. Water splitting takes place at interface 136 of layers 132 and 134. The effect of this water splitting is to render acidic the cation exchange layer 134 and its bounding anion exchange membrane 116, which prevents scale formation at anion exchange membrane 116. The cation exchange material is sufficiently close to the anion membrane so as to provide hydrogen ions to the surface of the anion membrane facing the concentrating flow channel.

Figure 7:
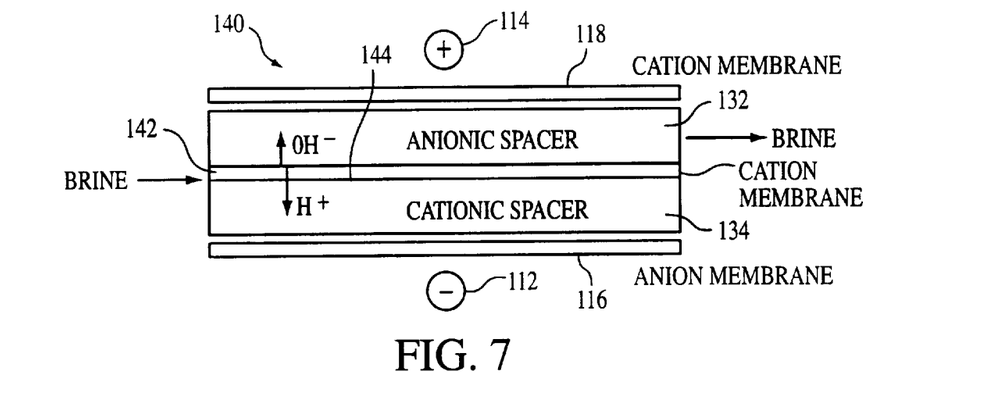

Referring to FIG. 7, concentrating channel 140 is similar to concentrating channel 130 (FIG. 6), except that cation permeable membrane 142 is placed between anionic spacer 132 and cationic spacer 134. Membrane 142 creates two separate brine streams, and water splitting now occurs at interface 144 of anionic spacer 132 and cation permeable membrane 142. This creates two separate concentrate streams. The concentrate stream flowing through the anion exchanging layer contains calcium, is slightly alkaline and contains no TIC and hence cannot scale. The concentrate stream flowing through the cation exchanging layer contains TIC and is slightly acidic, but it contains no calcium and hence cannot scale. This approach provides a very high degree of protection against scaling.

Figure 8:
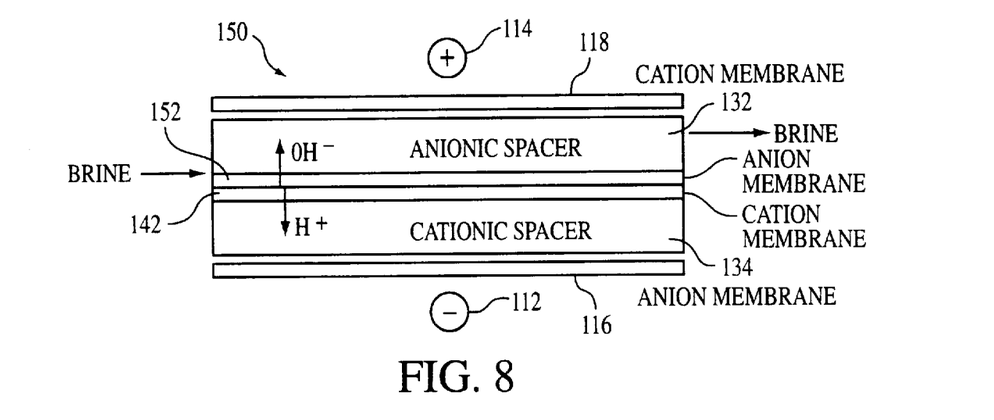

Referring to FIG. 8, concentrating channel 150 is similar to concentrating channel 140 (FIG. 7) except that anion permeable membrane 152 is placed between anionic spacer 132 and cation permeable membrane 142. Water splitting now takes place between membranes 132 and 142, and cation spacer 134 is again rendered acidic, preventing scale formation at anion membrane 116. These membranes furthermore prevent the transfer of cations to the acidic brine compartment in spacer 134 and of anions to the basic brine compartment in spacer 132.

Figure 9:
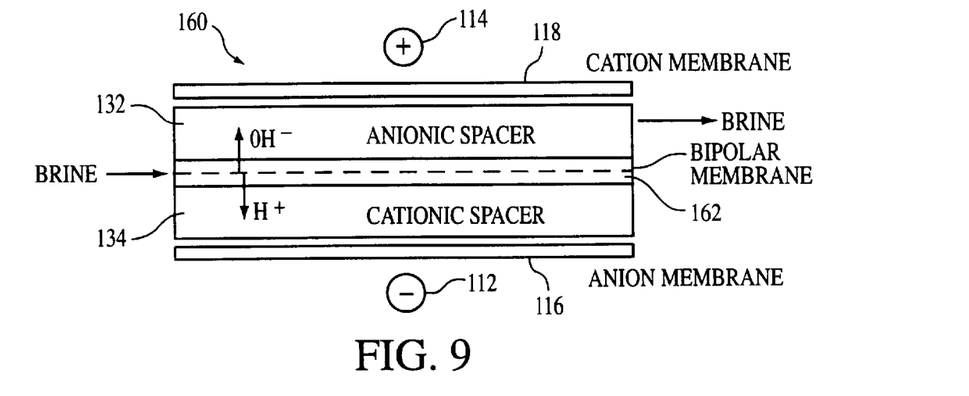
Figure 10:
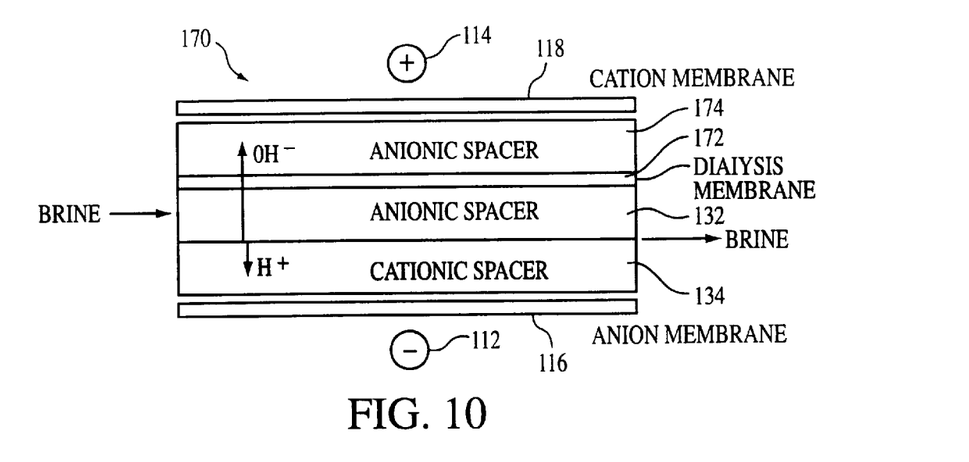

Referring to FIG. 9, concentrating channel 160 is similar to concentrating channel 150 (FIG. 8) except that bipolar membrane 162 replaces anion permeable membrane 152 and cation permeable membrane 142. Water splitting now takes place within bipolar membrane 162 at the interface of the cation and anion parts, and cation spacer 134 is again rendered acidic, preventing scale formation at anion membrane 116. Bipolar membrane 162 furthermore prevents the transfer of cations to the acidic brine compartment in spacer 134 and of anions to the basic brine compartment in spacer 132. In concentrating compartment 170, shown in FIG. 10, there is direct contact between cationic spacer 134 and anionic spacer 132, and there is dialysis membrane 172 and additional anionic spacer 174 between spacer 132 and cation membrane 118.

Figure 11:
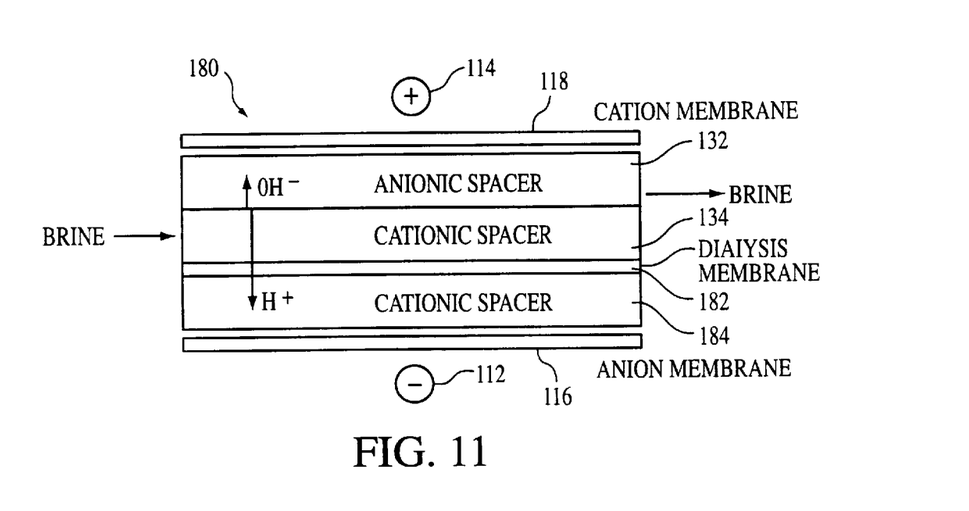

In concentrating compartment 180, shown in FIG. 11, there is direct contact between cationic spacer 134 and anionic spacer 132, and there is dialysis membrane 182 and additional cationic spacer 184 between spacer 132 and cation membrane 118. The dialysis membrane serves to inhibit the mixing of the alkaline portion of the brine, which contains Ca++, with the acidic portion of the brine and thus serves to reduce scaling potential.

In operation of deionization apparatus 10, 32 and 62, feed and brine are supplied to diluting channels 120 (FIG. 4) and concentrating channels 122, respectively, at typical flow rates (e.g., 1–3 cm/sec) and pressure (e.g., 5 to 50 psig), and electric power is supplied to cathode 112 and anode 114 to provide an appropriate current density of 2 to 15 mA/square cm and voltage of 1 to 5 volts per cell pair. The feed 16 supplied to the inlets 18, 42 (FIGS. 1–3) of diluting channels 120 is typically the permeate of reverse osmosis processing. The brine 26 supplied to the inlets of concentrating channels 22 is typically a mixture of the reverse osmosis permeate and brine recirculated from the outlet of the electrodeionization apparatus.

The removal of ions from diluting channels 120 includes two steps. The first step is the diffusion of cations to the cation exchanging solids and the diffusion of anions to the anion exchanging solids in the diluting channels. The applied electric field then causes anions on the exchanging material to travel along the anion exchanging material in the diluting channels in a conductive path to and through the anion permeable membrane into the concentrating compartment nearer the anode. The applied electric field similarly causes cations to travel along the cation exchanging materials in the diluting channels in a conductive path to and through the cation permeable membrane into the concentrating compartment nearer the cathode. The anions and cations become trapped in the concentrating compartments because the movement of anions toward the anode is blocked by a cation permeable membrane, and the movement of cations toward the cathode is blocked by an anion permeable membrane.

Other embodiments of the invention are within the scope of the appended claims.

In the claims:

1. Electrodeionization apparatus for purifying water including calcium and carbon dioxide and its hydrates comprising
   a first stage electrodeionization system followed by a second stage electrodeionization system,
   each said system including
      a cathode,
      an anode spaced from said cathode, a plurality of alternating anion permeable membranes and cation permeable membranes between said cathode and anode defining concentrating and diluting flow channels, each said channel being defined between an adjacent pair of said membranes,
      said first stage electrodeionization system including one member of the group consisting of a cation exchange resin and an anion exchange resin in a diluting flow channel, said second stage electrodeionization system including at least the other of said cation exchange resin and said anion exchange resin in a diluting flow channel, the outflow of water from said diluting flow channels in said first stage electrodeionization system being connected to be fed as the inflow for said diluting flow channels in said second stage electrodeionization system, the outflow of brine from each said concentrating flow channel in said first stage electrodeionization system being isolated from the inflow for any said concentrating flow channel in said second stage electrodeionization system, whereby said calcium and carbon dioxide and its hydrates tend to be removed in different stages so as to deter calcium carbonate precipitation in said concentrating flow channel.

2. The apparatus of claim 1 wherein said second stage electrodeionization system includes a mixed cation and anion exchange resin.

3. The apparatus of claim 1 wherein said first stage electrodeionization system includes cation exchange resin in the diluting compartments that causes removal of calcium and other cations in said first stage electrodeionization system.

4. The apparatus of claim 3 wherein each said concentrating flow channel includes cation exchange material next to said anion membrane, and anion exchange material between said cation membrane and said cation exchange material, whereby water splitting occurs between said anion exchange material and said cation exchange material.

5. The apparatus of claim 1 wherein said first stage includes anion exchange resin in the diluting compartments that causes removal of carbon dioxide and its hydrates and other anions in said first stage electrodeionization system.

6. The apparatus of claim 5 wherein each said concentrating flow channel includes cation exchange material next to said anion membrane, and anion exchange material between said cation membrane and said cation exchange material, whereby water splitting occurs between said anion exchange material and said cation exchange material.

7. The apparatus of claim 1 wherein each said concentrating flow channel of at least one of said first and second stage electrodeionization systems includes cation exchange material nearer to said anion membrane than said cation membrane.

8. The apparatus of claim 7 wherein each said concentrating flow channel includes anion exchange material between said cation membrane and said cation exchange material, whereby water splitting occurs between said anion exchange material and said cation exchange material.

9. Electrodeionization apparatus for purifying water including calcium and carbon dioxide and its hydrates comprising:

a cathode, an anode spaced from said cathode, a plurality of alternating anion permeable membranes and cation permeable membranes between said cathode and anode defining concentrating and diluting flow channels, each said channel being defined between an adjacent pair of said membranes, each said diluting flow channel having ion exchange materials therein, each said concentrating flow channel including cation exchange material nearer to said anion membrane than said cation membrane, whereby pH is lowered at the surface of said anion membrane in said concentrating flow channel so as to limit calcium carbonate precipitation in said concentrating flow channel.

10. The apparatus of claim 9 or 7 wherein said cation exchange material is in a fixed structure.

11. The apparatus of claim 9 wherein each said concentrating flow channel includes anion exchange material between said cation membrane and said cation exchange material, whereby water splitting occurs between said anion exchange material and said cation exchange material.

12. The apparatus of claim 11 wherein each said diluting channel includes anion exchange resin and cation exchange resin.

13. The apparatus of claim 11 or 12 wherein said anion exchange material is in a first fixed structure, and said cation exchange material is in a second fixed structure.

14. The apparatus of claim 11, 12, 4, or 6 wherein said anion exchange material and said cation exchange material in said concentrating channel directly contact each other.

15. The apparatus of claim 11, 12, 4, or 6 wherein a membrane is located between said anion exchange material and said cation exchange material in said concentrating channel.

16. The apparatus of claim 11, 12, 4, or 6 wherein a cation permeable membrane is located between said anion exchange material and said cation exchange material in said concentrating channel.

17. The apparatus of claim 11, 12, 4, or 6 wherein a cation permeable membrane and an anion permeable membrane are located between said anion exchange material and said cation exchange material in said concentrating channel, said cation permeable membrane being next to said cation exchange material, said anion permeable membrane being next to said anion exchange material.

18. The apparatus of claim 11, 12, 4, or 6 wherein a bipolar membrane having an anion part and a cation part is located between said anion exchange material and said cation exchange material in said concentrating channel, said bipolar membrane being oriented such that said cation part is next to said cation exchange material and said anion part is next to said anion exchange material.

19. The apparatus of claim 11, 12, 4, or 6 wherein said anion exchange material has two layers, and further comprising a dialysis membrane located between said two layers.

20. The apparatus of claim 11, 12, 4, or 6 wherein said cation exchange material has two layers, and further comprising a dialysis membrane located between said two layers.

21. A method of purifying water including calcium and carbon dioxide and its hydrates comprising flowing said water into diluting channels of a first stage electrodeionization system having one member of the group consisting of a cation exchange resin and an anion exchange resin in said diluting flow channels to provide a partially treated effluent, flowing a first brine through concentrating channels of said first stage electrodeionization system, flowing said partially treated effluent into diluting channels of a second stage electrodeionization system including at least the other of said cation exchange resin and said anion exchange resin, and flowing a second brine through concentrating channels of said second stage electrodeionization system, said first and second brines being isolated from each other, whereby said calcium and carbon dioxide and its hydrates tend to be removed in different stages so as to deter calcium carbonate precipitation in said concentrating flow channels.

22. The method of claim 21 wherein said diluting channels of said second stage electrodeionization system include a mixed cation and anion exchange resin.

23. The method of claim 21 wherein said diluting channels of said first stage electrodeionization system include cation exchange resin that causes removal of calcium and other cations in said first stage electrodeionization system.

24. The method of claim 21 wherein said diluting channels of said first stage include anion exchange resin that causes removal of anions carbon dioxide and its hydrates and other anions in said first stage electrodeionization system.

25. The method of claim 21 wherein each said concentrating flow channel includes cation exchange material next to said anion membrane.

26. The method of claim 21 wherein each said concentrating flow channel includes anion exchange material between said cation membrane and said cation exchange material, and further comprising water splitting between said anion exchange material and said cation exchange material.

27. A method of purifying water including calcium and carbon dioxide and its hydrates comprising flowing said water into diluting channels of an electrodeionization system, flowing a first brine through concentrating channels of said electrodeionization system, and lowering pH at the surfaces of anion exchange membranes in said concentrating flow channels so as to limit calcium carbonate precipitation in said concentrating flow channels.

28. The method of claim 27 wherein each said concentrating flow channel includes cation exchange material next to said anion membrane.

29. The method of claim 27 wherein each said concentrating flow channel includes anion exchange material between said cation membrane and said cation exchange material, and further comprising water splitting between said anion exchange material and said cation exchange material.

* * * * *

UNITED STATES PATENT AND TRADEMARK OFFICE
CERTIFICATE OF CORRECTION

PATENT NO.    : 6,187,162 B1
DATED         : February 13, 2001
INVENTOR(S)   : Leon Mir Page 1 of 1

It is certified that error appears in the above-identified patent and that said Letters Patent is hereby corrected as shown below:

Title page,
References Cited, patent 5,228,989, change "Afetan" to -- Afeyan --

Column 2,
Line 40, change "OH--" to -- OH- --
Line 42, change "$CO_3^{50}$" to -- $CO_3^=$ --

Column 5,
Line 34, insert a space between "$ca^{++}$" and the word "and"

Signed and Sealed this

Twelfth Day of March, 2002

Attest:

Attesting Officer

JAMES E. ROGAN
Director of the United States Patent and Trademark Office